(12) United States Patent
Frydman et al.

(10) Patent No.: US 8,632,627 B2
(45) Date of Patent: Jan. 21, 2014

(54) GAS DEHYDRATION SYSTEM WITH DESICCANT TRANSPORTER

(75) Inventors: Arnaldo Frydman, Houston, TX (US); Raul Eduardo Ayala, Houston, TX (US); Shailesh Vijay Potnis, Houston, TX (US)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 12/854,075

(22) Filed: Aug. 10, 2010

(65) Prior Publication Data

US 2012/0037002 A1 Feb. 16, 2012

(51) Int. Cl.
*B01D 53/02* (2006.01)

(52) U.S. Cl.
USPC ........... 96/125; 96/143; 96/144; 96/146; 96/150; 62/94; 62/271; 165/7; 95/107; 95/108; 95/113

(58) Field of Classification Search
USPC ........ 96/125, 143, 144, 146, 150; 62/94, 271; 165/7; 95/107, 108
See application file for complete search history.

(56) References Cited

U.S. PATENT DOCUMENTS

| | | | |
|---|---|---|---|
| 4,012,206 A * | 3/1977 | Macriss et al. | 95/113 |
| 4,402,717 A * | 9/1983 | Izumo et al. | 96/118 |
| 4,589,892 A * | 5/1986 | Leonard | 96/115 |
| 4,702,090 A | 10/1987 | Barclay et al. | |
| 4,769,053 A * | 9/1988 | Fischer, Jr. | 96/125 |
| 4,926,618 A * | 5/1990 | Ratliff | 95/10 |
| 4,939,906 A * | 7/1990 | Spatz et al. | 62/94 |
| 4,948,392 A * | 8/1990 | Rush | 95/113 |
| 5,040,375 A * | 8/1991 | Von Dobeln | 62/94 |
| 5,158,582 A * | 10/1992 | Onitsuka et al. | 95/129 |
| 5,512,083 A * | 4/1996 | Dunne | 95/113 |
| 5,667,560 A * | 9/1997 | Dunne | 95/113 |
| 5,688,305 A * | 11/1997 | Graeff | 95/14 |
| 5,817,167 A * | 10/1998 | DesChamps | 95/113 |
| 5,891,219 A * | 4/1999 | Klobucar et al. | 95/113 |
| 6,361,585 B1 * | 3/2002 | Anzai et al. | 95/113 |
| 6,526,759 B2 | 3/2003 | Zimm et al. | |
| 6,668,560 B2 | 12/2003 | Zimm et al. | |
| 7,217,313 B2 * | 5/2007 | Motono et al. | 95/113 |
| 7,326,277 B1 * | 2/2008 | Cohen et al. | 95/113 |
| 7,338,548 B2 * | 3/2008 | Boutall | 95/14 |
| 7,582,139 B2 * | 9/2009 | Kurosawa et al. | 95/113 |
| 7,585,338 B2 | 9/2009 | Yoshizaki | |
| 7,687,044 B2 | 3/2010 | Keefer et al. | |
| 7,886,986 B2 * | 2/2011 | Fischer et al. | 236/49.3 |
| 2005/0217481 A1 * | 10/2005 | Dunne et al. | 95/113 |
| 2006/0015974 A1 * | 1/2006 | Ike | D23/359 |
| 2006/0196356 A1 * | 9/2006 | Henderson et al. | 95/107 |
| 2007/0028769 A1 * | 2/2007 | Eplee et al. | 95/113 |
| 2007/0040290 A1 * | 2/2007 | Lin | 261/154 |

* cited by examiner

*Primary Examiner* — Christopher P Jones
(74) *Attorney, Agent, or Firm* — Fletcher Yoder, P.C.

(57) ABSTRACT

A gas dehydrator system, including, a desiccant transport wheel configured to rotate a solid desiccant from a first dehydration section to a first regeneration section, a first gas path extending through the first dehydration section, wherein the solid desiccant is configured to collect moisture from a first gas in the first gas path, and a second gas path extending through the first regeneration section, wherein the solid desiccant is configured to release the moisture into a second gas in the second gas path to regenerate the solid desiccant.

24 Claims, 7 Drawing Sheets

GAS DEHYDRATION SYSTEM WITH DESICCANT TRANSPORTER

BACKGROUND OF THE INVENTION

The disclosed subject matter relates to a system for gas dehydration. More specifically, the disclosed subject matter relates to carbon dioxide dehydration associated with carbon capture systems.

Integrated gasification combined cycle (IGCC) power plants are capable of generating energy from various carbonaceous feedstock, such as coal or natural gas, relatively cleanly and efficiently. IGCC technology may convert the carbonaceous feedstock into a gas mixture of carbon monoxide (CO) and hydrogen ($H_2$), i.e., syngas, by reaction with oxygen and steam in a gasifier. These gases may be cleaned, processed, and utilized as fuel in the IGCC power plant. For example, the syngas may be fed into a combustor of a gas turbine of the IGCC power plant and ignited to power the gas turbine for use in the generation of electricity. During gas treatment of the syngas, it may be desirable to capture carbon dioxide ($CO_2$) for reduced environmental impact, and use of the carbon dioxide in various applications. Unfortunately, the carbon dioxide often contains significant moisture (e.g., water content), which can corrode the transportation infrastructure (e.g., pipelines, storage tanks, etc.). Existing dehydration systems are undesirable for several reasons: including large pressure drops, complex valve arrangements, considerable downtime, and inability to meet stringent standards of moisture removal for carbon dioxide.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a carbon dioxide dehydration system, including, a desiccant transporter configured to transport a solid desiccant from a first dehydration section to a first regeneration section, a $CO_2$ path extending through the first dehydration section, wherein the solid desiccant is configured to collect moisture from $CO_2$ in the $CO_2$ path, and a gas path extending through the first regeneration section, wherein the solid desiccant is configured to release the moisture into a gas in the gas path to regenerate the solid desiccant.

In another embodiment, a gas dehydrator system, including, a desiccant transport wheel configured to rotate a solid desiccant from a first dehydration section to a first regeneration section, a first gas path extending through the first dehydration section, wherein the solid desiccant is configured to collect moisture from a first gas in the first gas path, and a second gas path extending through the first regeneration section, wherein the solid desiccant is configured to release the moisture into a second gas in the second gas path to regenerate the solid desiccant.

In another embodiment, a gas dehydrator system, including, a desiccant vessel comprising a counter flow dehydration region, a desiccant path configured to route a solid desiccant through the counterflow dehydration region in a first direction, and a first gas path configured to route a first gas through the counterflow dehydration region in a second direction opposite to the first direction, wherein the solid desiccant is configured to collect moisture from the first gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
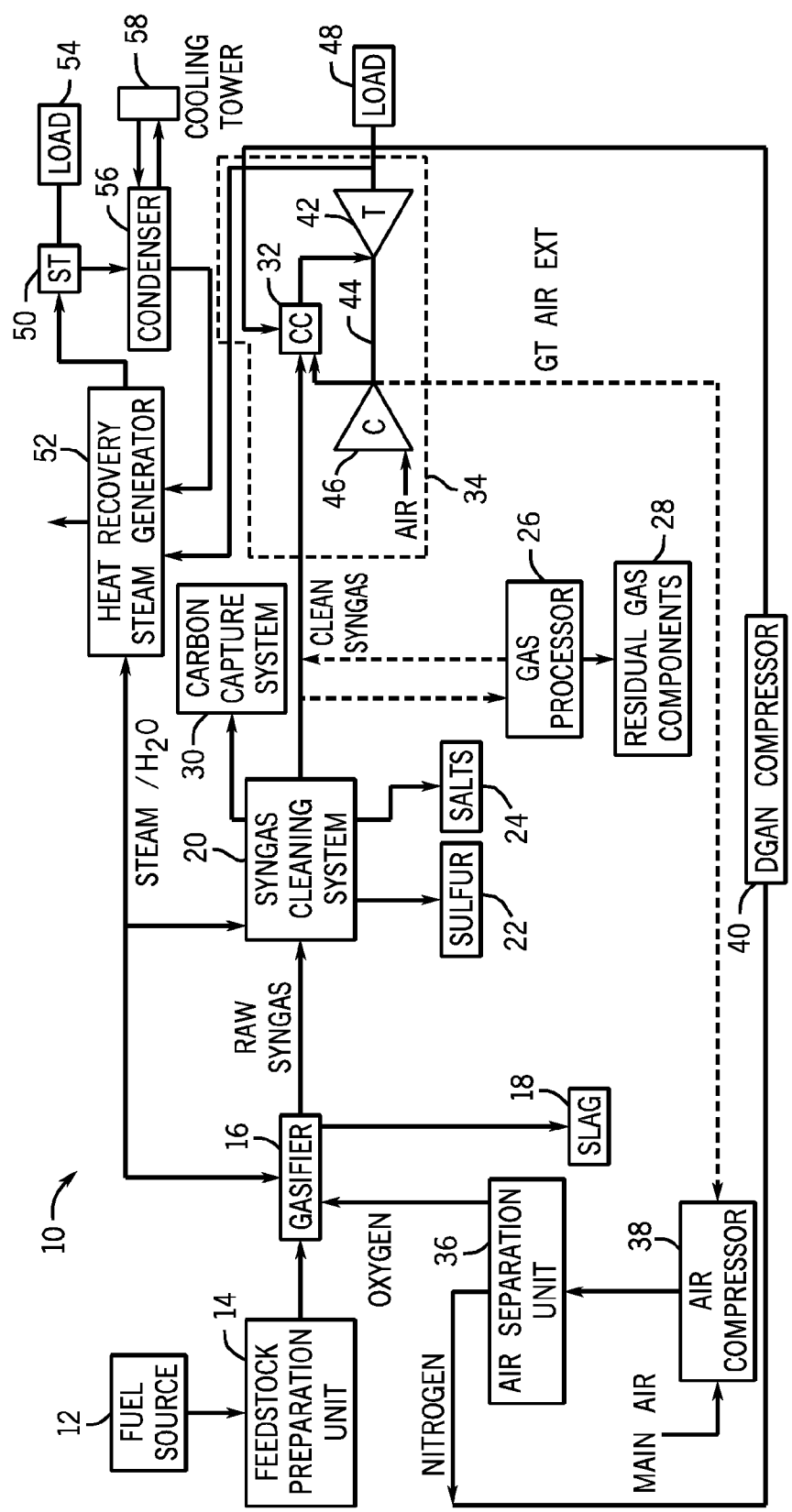
FIG. 1 is a schematic of an embodiment of an integrated gasification combined cycle (IGCC) power plant having a carbon capture system.

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to carbon dioxide compression and dehydration. In particular, the disclosed embodiments include a carbon dioxide dehydration system with a desiccant transporter, which is configured to transport a solid desiccant between at least one dehydration section and at least one regeneration section. In each embodiment, the solid desiccant absorbs or adsorbs moisture from the carbon dioxide in a dehydration section, moves from the dehydration section to a regeneration section, releases the moisture in the regeneration section, and then moves to another dehydration section to repeat the cycle. The regeneration section may include a pressure drop, a heat addition, and/or use of a carrier gas (e.g., nitrogen) to remove the moisture from the solid desiccant. The solid desiccant may be described as a hygroscopic substance, and may include silica, calcium sulfate, calcium chloride, or another suitable substance. As the carbon dioxide flows through each dehydration section, the desiccant transporter provides a continuous, semi-continuous, or stepwise supply of regenerated (e.g., dried) solid desiccant from a regeneration section to the respective dehydration section. For example, the desiccant transporter may include a rotating wheel with desiccant chambers, which rotate between the dehydration sections and the regeneration sections. By further example, the desiccant transporter may include a desiccant pump, conveyor, or flow inducing apparatus, which induces flow of the solid desiccant (e.g., two-phase flow in a carrier gas) between the dehydration sections and the regeneration sections. In addition, the dehydration sections may induce a counterflow of carbon dioxide and solid desiccant to increase the efficiency of the dehydration. As discussed below, each embodiment of the desiccant transporter maintains dryness of the solid desiccant above a minimum dryness level in the dehydration sections, thereby enabling dehydration of the carbon dioxide to meet stringent standards, e.g., moisture content less than approximately 20 parts per million by volume (ppmv). The disclosed embodiments of the carbon dioxide dehydration system also generally avoid large pressure drops, complex valve arrangements, and downtime.

FIG. 1 is a schematic of an embodiment of an integrated gasification combined cycle (IGCC) power plant 10 having a carbon capture system 30 with a carbon dioxide dehydration system. As discussed in detail below, the carbon capture system 30 may capture carbon dioxide from a gasification and treatment process, compress the carbon dioxide, and dehydrate the carbon dioxide for use in various applications. In the disclosed embodiments, the carbon capture system 30 iteratively transports a solid desiccant between one or more dehydration sections and one or more regeneration sections, thereby providing a substantially continuous supply of regenerated (e.g., dried) solid desiccant to dehydrate the carbon dioxide without any downtime. The following discussion of the IGCC power plant 10 provides one possible context for the disclosed carbon dioxide dehydration systems, but is not intended to limit the scope to IGCC. Furthermore, although the following discussion relates to dehydration of carbon dioxide, the disclosed carbon dioxide dehydration systems are not limited to carbon dioxide, but rather the systems are applicable to dehydration of any gas.

As illustrated in FIG. 1, the IGCC plant 10 is powered by a fuel source 12, such as a solid feed, which is used to generate syngas. The fuel source 12 may include coal, petroleum coke, biomass, wood-based materials, agricultural wastes, tars, coke oven gas and asphalt, or other carbon containing items. The solid fuel of the fuel source 12 may be passed to a feedstock preparation unit 14. The feedstock preparation unit 14 may, for example, resize or reshape the fuel source 12 by chopping, crushing, milling, shredding, pulverizing, briquetting, or palletizing the fuel source 12 to generate feedstock. Additionally, water, or other suitable liquids, may be added to the fuel source 12 in the feedstock preparation unit 14 to create slurry feedstock. In other embodiments, no liquid is added to the fuel source 12, thus yielding dry feedstock.

The feedstock may be passed to a gasifier 16 from the feedstock preparation unit 14. The gasifier 16 may convert the feedstock into a combination of carbon monoxide, carbon dioxide, water, and hydrogen, e.g., syngas. This conversion may be accomplished by subjecting the feedstock to a controlled amount of steam and oxygen at elevated pressures (e.g. from approximately 290 psia to 1230 psia) and temperatures (e.g., approximately 1300° F.-2900° F.), depending on the type of gasifier 16 utilized. The gasification process may include the feedstock undergoing a pyrolysis process, whereby the feedstock is heated. Temperatures inside the gasifier 16 may range from approximately 300° F. to 1300° F. during the pyrolysis process, depending on the fuel source 12 utilized to generate the feedstock. The heating of the feedstock during the pyrolysis process may generate a solid, e.g., char, and residue gases, e.g., carbon monoxide, and hydrogen.

A combustion process may then occur in the gasifier 16. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 1300° F. to 2900° F. Next, steam may be introduced into the gasifier 16 during a gasification step. The char may react with the carbon dioxide and steam to produce carbon monoxide and hydrogen at temperatures ranging from approximately 1500° F. to 2000° F. In essence, the gasifier utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier 16. This resultant gas may include approximately 85% of carbon monoxide and hydrogen, as well as $CH_4$, $CO_2$, $H_2O$, HCl, HF, COS, $NH_3$, HCN, and $H_2S$ (based on the sulfur content of the feedstock). This resultant gas may be termed raw syngas. The gasifier 16 may also generate waste, such as slag 18, which may be a wet ash material. This slag 18 may be removed from the gasifier 16 and disposed of, for example, as road base or as another building material.

The raw syngas from the gasifier 16 may then be cleaned in a syngas cleaning system 20. For example, the syngas cleaning system 20 may scrub the cooled raw (e.g., non-scrubbed) syngas to remove the HCl, HF, COS, HCN, and $H_2S$ from the cooled raw (e.g., non-scrubbed) syngas, which may include separation of sulfur 22 by, for example, an acid gas removal (AGR) process. Furthermore, the syngas cleaning system 20 may separate salts 24 from the cooled raw (e.g., non-scrubbed) syngas via a water treatment process that may utilize water purification techniques to generate usable salts 24 from the cooled raw (e.g., non-scrubbed) syngas. Subsequently, the gas from the syngas cleaning system 20 may include clean (e.g., scrubbed) syngas. In certain embodiments, a gas processor 26 may be utilized to remove residual gas components 28 from the clean (e.g., scrubbed) syngas such as, ammonia, methanol, or any residual chemicals. However, removal of residual gas components 28 from the clean (e.g., scrubbed) syngas is optional, since the clean (e.g., scrubbed) syngas may be utilized as a fuel even when containing the residual gas components 28, e.g., tail gas.

In addition, in certain embodiments, a carbon capture system 30 may remove and process the carbonaceous gas (e.g., carbon dioxide that is approximately 80-100 percent pure by volume) contained in the syngas. The carbon capture system 30 also may include a compressor, a purifier, a dehydrator, a pipeline that supplies $CO_2$ for sequestration or enhanced oil recovery, a $CO_2$ storage tank, or any combination thereof. Embodiments of the dehydrator are discussed in detail below with reference to FIGS. 2-7. The scrubbed syngas, which has undergone the removal of its sulfur containing components and a large fraction of its carbon dioxide, may be then transmitted to a combustor 32, e.g., a combustion chamber, of a gas turbine engine 34 as combustible fuel. As described in greater detail below, the scrubbed syngas delivered to the combustor 32 may contain higher percentages of hydrogen than syngas generated by IGCC plants that do not use carbon capture techniques.

The IGCC plant 10 may further include an air separation unit (ASU) 36. The ASU 36 may operate to separate air into component gases by, for example, distillation techniques. The ASU 36 may separate oxygen from the air supplied to it from an ASU compressor 38, and the ASU 36 may transfer the separated oxygen to the gasifier 16. Additionally, the ASU 36 may transmit separated nitrogen to a diluent gaseous nitrogen (DGAN) compressor 40. As described below, the ASU compressor 38 may include one or more compression sections, one or more inter-coolers between the compression sections, and/or one or more after-coolers after the compression sections. The inter-coolers and after-coolers may cool the compressed air before delivering the compressed air to the ASU 36.

The DGAN compressor 40 may compress the nitrogen received from the ASU 36 at least to pressure levels equal to those in the combustor 32 of the gas turbine engine 34, for proper injection to happen into the combustor chamber. Thus, once the DGAN compressor 40 has adequately compressed the nitrogen to a proper level, the DGAN compressor 40 may transmit the compressed nitrogen to the combustor 32 of the gas turbine engine 34. The nitrogen may be used as a diluent to facilitate control of emissions, for example.

The gas turbine engine 34 may include a turbine 42, a drive shaft 44 and a compressor 46, as well as the combustor 32. The combustor 32 may receive fuel, such as syngas, which may be injected under pressure from fuel nozzles. This fuel may be mixed with compressed air as well as compressed nitrogen from the DGAN compressor 40, and combusted within combustor 32. This combustion may create hot pressurized combustion gases.

The combustor 32 may direct the combustion gases towards an inlet of the turbine 42. As the combustion gases from the combustor 32 pass through the turbine 42, the combustion gases may force turbine blades in the turbine 42 to rotate the drive shaft 44 along an axis of the gas turbine engine 34. As illustrated, drive shaft 44 is connected to various components of the gas turbine engine 34, including the compressor 46. The drive shaft 44 may connect the turbine 42 to the compressor 46 to form a rotor. The compressor 46 may include blades coupled to the drive shaft 44. Thus, rotation of turbine blades in the turbine 42 causes the drive shaft 44 connecting the turbine 42 to the compressor 46 to rotate blades within the compressor 46. This rotation of blades in the compressor 46 may cause the compressor 46 to compress air received via an air intake in the compressor 46. The compressed air may then be fed to the combustor 32 and mixed with fuel and compressed nitrogen to allow for higher efficiency combustion. The drive shaft 44 may also be connected to a first load 48, which may be a stationary load, such as an electrical generator for producing electrical power, for example, in a power plant. Indeed, the first load 48 may be any suitable device that is powered by the rotational output of the gas turbine engine 34.

The IGCC plant 10 also may include a steam turbine engine 50 and a heat recovery steam generation (HRSG) system 52. The steam turbine engine 50 may drive a second load 54. The second load 54 may also be an electrical generator for generating electrical power. However, both the first and second loads 48, 54 may be other types of loads capable of being driven by the gas turbine engine 34 and steam turbine engine 50, respectively. In addition, although the gas turbine engine 34 and steam turbine engine 50 may drive separate loads 48 and 54, as shown in the illustrated embodiment, the gas turbine engine 34 and steam turbine engine 50 may also be utilized in tandem to drive a single load via a single shaft. The specific configuration of the steam turbine engine 50, as well as the gas turbine engine 34, may be implementation-specific and may include any combination of sections.

The IGCC plant 10 may also include the HRSG 52. Heated exhaust gas from the gas turbine engine 34 may be transported into the HRSG 52 and used to heat water and produce steam used to power the steam turbine engine 50. Exhaust from, for example, a low-pressure section of the steam turbine engine 50 may be directed into a condenser 56. The condenser 56 may utilize a cooling tower 58 to exchange heated water for cooled water. The cooling tower 58 acts to provide cool water to the condenser 56 to aid in condensing the steam transmitted to the condenser 56 from the steam turbine engine 50. Condensate from the condenser 56 may, in turn, be directed into the HRSG 52. Again, exhaust from the gas turbine engine 34 may also be directed into the HRSG 52 to heat the water from the condenser 56 and produce steam.

In combined cycle systems such as the IGCC plant 10, hot exhaust may flow from the gas turbine engine 34 and pass to the HRSG 52, where it may be used to generate high-pressure, high-temperature steam. The steam produced by the HRSG 52 may then be passed through the steam turbine engine 50 for power generation. In addition, the produced steam may also be supplied to any other processes where steam may be used, such as to the gasifier 16. The gas turbine engine 34 generation cycle is often referred to as the "topping cycle," whereas the steam turbine engine 50 generation cycle is often referred to as the "bottoming cycle." By combining these two cycles as illustrated in FIG. 1, the IGCC plant 10 may lead to greater efficiencies in both cycles. In particular, exhaust heat from the topping cycle may be captured and used to generate steam for use in the bottoming cycle.

IGCC plants, which utilize carbon capture techniques, such as the carbon capture system 30 illustrated in FIG. 1, operate somewhat differently than typical IGCC plants. For example, the scrubbed syngas delivered to the combustor 32 of the gas turbine engine 34 may be referred to as "high-hydrogen" syngas. In other words, the scrubbed syngas combusted in the combustor 32 may, in certain embodiments, consist of greater than approximately two-thirds $H_2$ by volume, as opposed to lower percentages of $H_2$ in non-carbon capture IGCC plants. More specifically, the term "high-hydrogen" may relate to syngas with a ratio of $H_2/CO$ of approximately greater than 2. The reason for the higher percentage of $H_2$ in the scrubbed syngas is that, as described above, the carbon capture system 30 may remove much of the carbonaceous gases from the scrubbed syngas upstream of the combustor 32. As such, the relative percentage of carbon components in the scrubbed syngas is reduced, thereby increasing the relative percentage of hydrogen components.

Figure 2:
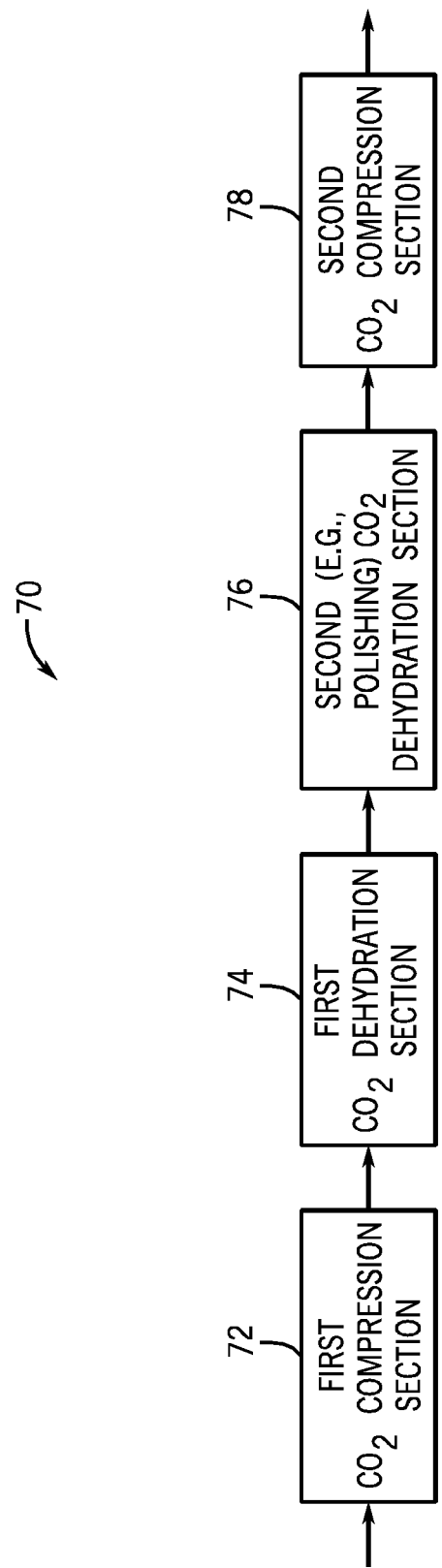
FIG. 2 is a schematic of an embodiment of a carbon dioxide compression and dehydration system with multiple dehydration and compression sections.

FIG. 2 is a schematic of an embodiment of a carbon dioxide compression and dehydration system 70 with multiple dehydration and compression sections 72, 74, 76, and 78. In particular, the system 70 includes a first $CO_2$ compression section 72, a first $CO_2$ dehydration section 74, a second $CO_2$ dehydration section 76, and a second $CO_2$ compression section 78. The first $CO_2$ compression section 72 receives a supply of carbon dioxide from the carbon capture system 30 of FIG. 1, and compresses the carbon dioxide to a first pressure level. For example, the first pressure level may be at least approximately 200 to 800 or 400 to 600 PSIG. The first $CO_2$ dehydration section 74 then uses a first dehydration mechanism to remove moisture from the compressed carbon dioxide to achieve a first moisture level. In turn, the second $CO_2$ dehydration section 76 uses a second dehydration mechanism to remove additional moisture from the compressed, dehydrated carbon dioxide to a second moisture level. The second $CO_2$ compression section 78 then further compresses the compressed, dehydrated carbon dioxide to a second pressure level. For example, the second pressure level may be at least approximately 1000 to 2000 PSIG. As discussed in detail below, at least one of the dehydration sections 74 and 76 includes a solid desiccant based dehydration system with a desiccant transporter, which iteratively transports a solid desiccant between dehydration and regeneration sections.

In certain embodiments, the first and second $CO_2$ compression sections 72 and 78 may include the same or different types of compression mechanisms, such as centrifugal compressors, axial flow compressors, reciprocating compressors, rotary vane compressors, scroll compressors, staged compressors, or a combination thereof. Likewise, the first and second $CO_2$ dehydration sections 74 and 76 may include the same or different types of dehydration mechanisms, such as a glycol based dehydration mechanism, a solid desiccant dehydration mechanism, or a combination thereof. In certain embodiments, the first $CO_2$ dehydration section 74 includes one or more bulk dehydration mechanisms, and the second $CO_2$ dehydration section 76 includes one or more polishing dehydration mechanisms. For example, the first $CO_2$ dehydration section 74 may include a glycol based dehydration mechanism configured to remove a substantial portion of the moisture content in the carbon dioxide, while the second $CO_2$ dehydration section 76 may include a solid desiccant based dehydration mechanism to reduce the moisture content to levels not attainable by the glycol based dehydration mechanism. For example, the first $CO_2$ dehydration section 74 may remove at least 50, 60, 70, 80, 90, 95, or greater percent of the moisture content in the carbon dioxide, while the second $CO_2$ dehydration section 76 substantially removes the remaining moisture content in the carbon dioxide. In certain embodiments, the first $CO_2$ dehydration section 74 may reduce the moisture content in the carbon dioxide to approximately 100 to 200 ppmv, while the second $CO_2$ dehydration section 76 may reduce the moisture content in the carbon dioxide to less than approximately 5, 10, 15, 20, 25, or 30 ppmv. However, the disclosed embodiments are not limited to any particular level of moisture removal.

Figure 3:
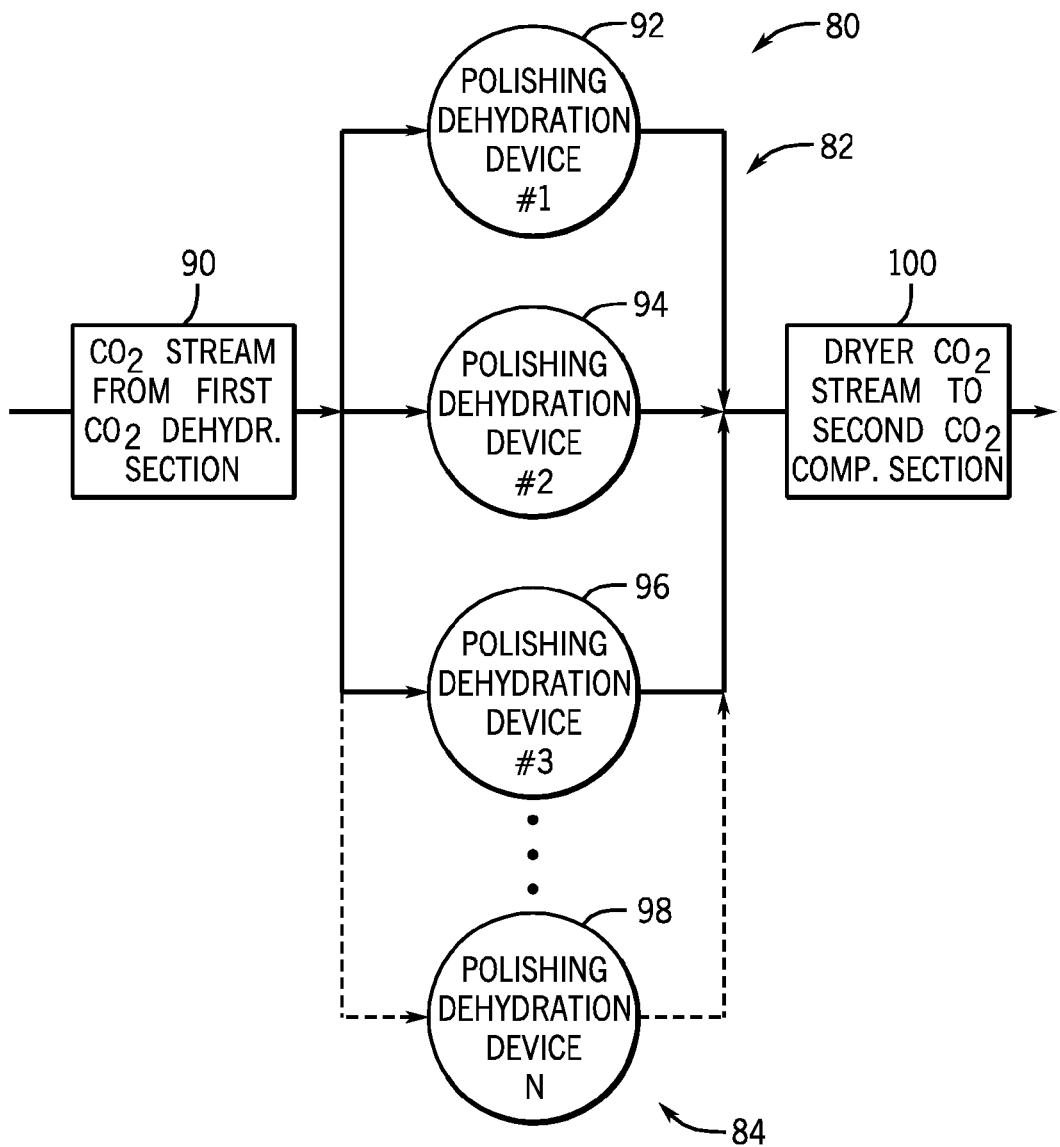
FIG. 3 is a schematic of an embodiment of a carbon dioxide compression and dehydration system with multiple polishing dehydration devices in a parallel arrangement.

FIG. 3 is a schematic of an embodiment of a carbon dioxide compression and dehydration system 80 with a polishing dehydration system 82 (e.g., the second CO2 dehydration section 76 of FIG. 2) having multiple polishing dehydration devices 84 in a parallel arrangement. In the illustrated embodiment, the polishing dehydration system 82 receives a $CO_2$ stream from a first $CO_2$ dehydration section (e.g., section 74 of FIG. 2), as indicated by block 90. The polishing dehydration system 82 passes parallel flows of the compressed, dehydrated carbon dioxide through a plurality of polishing dehydration devices 84, such as polishing dehydration devices 92, 94, 96, and 98. In the illustrated embodiment of FIG. 3, at least one of the polishing dehydration devices 84 includes a solid desiccant based dehydration device with a desiccant transporter, which iteratively transports a solid desiccant between dehydration and regeneration sections. Although FIG. 3 illustrates four polishing dehydration devices 84 in a parallel arrangement, the polishing dehydration system 82 may include any number (e.g., 1 to 100) of polishing dehydration devices 84 in parallel and/or serial arrangements. However, the parallel arrangement increases the flow capability of the polishing dehydration system 82, while also allowing maintenance on one or more devices 84 while others continue to operate. Upon exiting the polishing dehydration system 82, the compressed dehydrated carbon dioxide flows into a second $CO_2$ compression section (e.g., section 78 of FIG. 2), as indicated by block 100.

Figure 4:
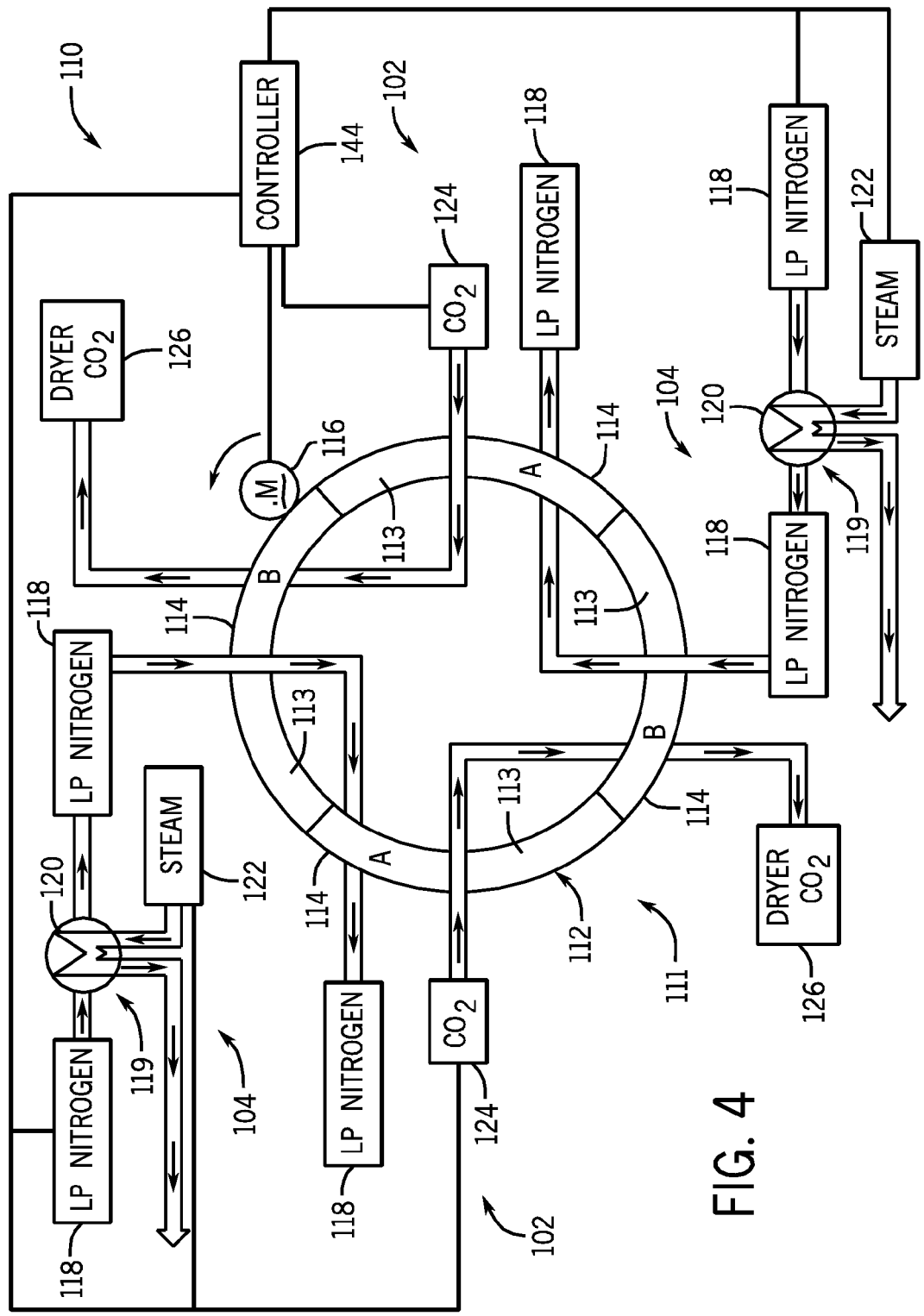
FIG. 4 is a schematic of an embodiment of a carbon dioxide dehydration device comprising a wheel-type desiccant transporter with solid desiccant chambers that move between dehydration and regeneration sections, illustrating a first regeneration stage of the regeneration section.
Figure 5:
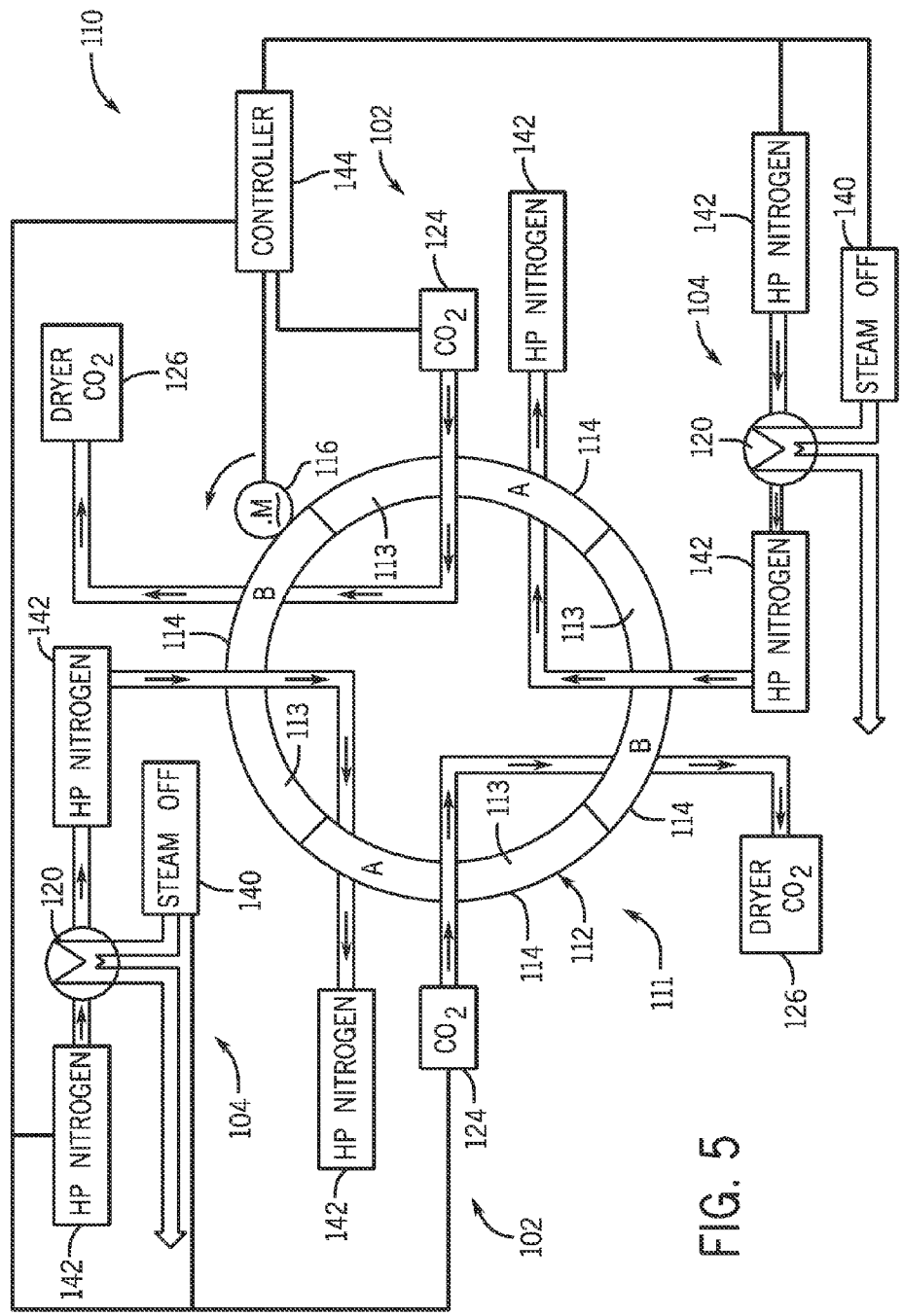
FIG. 5 is a schematic of an embodiment of the carbon dioxide dehydration device of FIG. 4, illustrating a second regeneration stage of the regeneration section.

FIGS. 4 and 5 are schematics of an embodiment of a carbon dioxide dehydration system 110 comprising a wheel-type desiccant transporter 111 having a wheel 112 with solid desiccant chambers 114 that move between dehydration sections 102 and regeneration sections 104. As discussed below, FIG. 4 illustrates the regeneration sections 104 in a first stage of desiccant regeneration, whereas FIG. 5 illustrates the regeneration sections 104 in a second stage of desiccant regeneration. In certain embodiments, the carbon dioxide dehydration system 110 may be a polishing dehydration device, such as the second $CO_2$ dehydration section 76 of FIG. 2 or one of the polishing dehydration devices 84 of FIG. 3. Thus, the carbon dioxide dehydration system 110 may be configured to dehydrate the carbon dioxide to a moisture content of less than approximately 5, 10, 15, 20, 25, or 30 ppmv. As discussed in detail below, the desiccant transporter 111 includes a motor 116 coupled to the wheel 112 to rotate the solid desiccant chambers 114 sequentially among the dehydration and regeneration sections 102 and 104. The solid desiccant chambers 114 labeled as "A" are shown in opposite carbon dioxide dehydration sections 102, whereas the solid desiccant chambers 114 labeled as "B" are shown in opposite desiccant regeneration sections 104.

In the illustrated embodiment of FIGS. 4 and 5, the wheel 112 includes four solid desiccant chambers 114 defined by four quadrants of the wheel 112. For example, each chamber 114 represents a 90 degree segment of the wheel 112, e.g., a quarter annular chamber. In other embodiments, the wheel 112 may include any number of chambers 114, e.g., 2 to 100 chambers. For example, the wheel 112 may have at least 2, 3, 4, 5, 6, 7, 8, 9, or 10 chambers 114 defined by circumferential segments about the wheel 112. Furthermore, the number of dehydration sections 102 may be equal to one-half the number of chambers 114, and the number of regeneration sections 104 may be equal to one-half the number of chambers 114. As the motor 116 drives the wheel 112 to rotate, each solid desiccant chamber 114 moves in an alternating manner among the dehydration and regeneration sections 102 and 104. Each solid desiccant chamber 114 contains at least one type of solid desiccant 113. For example, the solid desiccant 113 may include alumina-based desiccants, silica-based desiccants, calcium-based desiccants, molecular sieves, or other desiccant or hydrophilic substances, alone or in combination with one another. By further example, the solid desiccant 113 may include powder, pellets, flakes, or monolithic porous structures (e.g., wires, plates, etc.). As each chamber 114 aligns with one of the dehydration sections 102, the solid desiccant 113 absorbs or adsorbs moisture from a flow of carbon dioxide 124. Eventually, the solid desiccant 113 increases in moisture content to a level that decreases its efficiency. After a predetermined amount of time or in response to sensor feedback indicative of the level, the wheel 112 rotates to move the chambers 114 containing the high moisture content solid desiccant 113 from the dehydration sections 102 to the regeneration sections 104, while simultaneously moving the chambers 114 containing the low moisture content (e.g., dried) solid desiccant 113 from the regeneration sections 104 to the dehydration sections 102. As each chamber 114 aligns with one of the regeneration sections 104, the solid desiccant 113 releases the moisture into a carrier gas, such as nitrogen 118.

As illustrated in FIG. 4, the carbon dioxide dehydration system 110 has the regeneration sections 104 in a first stage of desiccant regeneration. In the first regeneration stage, the illustrated regeneration sections 104 flow a low-pressure carrier gas in a gas path, e.g., low-pressure (LP) nitrogen 118, to evaporate the water out of the desiccant 113 in the sections labeled as "B." In other embodiments, a different low-pressure carrier gas may be used with a particular desiccant 113. The regeneration sections 104 also include a heating system 119 configured to heat the low-pressure nitrogen 118 to increase the evaporation of the water from the desiccant 113. For example, the illustrated heating systems 119 include a heat exchanger 120, which transfers heat from a steam supply to the low-pressure nitrogen 118. In other embodiments, the heating system 119 may transfer heat from an exhaust gas, a heated water, a heated solvent, or another heated liquid into the low-pressure nitrogen 118. Using a suitable heat source, the heating system 119 increases the temperature of the low-pressure nitrogen 118 to an elevated temperature, e.g., greater than approximately 250, 300, 350, or 400 degrees Fahrenheit. As the heated low-pressure nitrogen 118 flows through the moist solid desiccant 113 in the chambers 114 labeled as "B," the nitrogen 118 evaporates and carries away the water to dry out the solid desiccant 113.

While the chambers 114 labeled as "B" are undergoing the first stage in regeneration of the solid desiccant 113, the chambers 114 labeled "A" are simultaneously dehydrating moist carbon dioxide gas 124. The carbon dioxide gas 124 flowing in a carbon dioxide gas path and contacting the desiccant 113 may have a water content of approximately 100 ppmv or greater. After passing through the solid desiccant 113, the solid desiccant chamber 114 outputs a dryer carbon dioxide 126. For instance, the dryer carbon dioxide 126 may have a water concentration of less than approximately 5, 10, 15, 20, 25, or 30 ppmv.

As further illustrated in FIGS. 4 and 5, the carbon dioxide dehydration system 110 includes a controller 144 coupled to the wheel-type desiccant transporter 111, the dehydration sections 102, and the regeneration sections 104. For example, the controller 144 is coupled to the motor 116 to control movement of the chambers 114 between the dehydration and regeneration sections 104. The controller 144 may automatically rotate the wheel 112 after a time delay, in response to user input, in response to feedback indicative of a threshold moisture level (e.g., upper moisture limit) in the desiccant 113 currently being used for dehydration in the chambers 114 labeled as "A", in response to feedback indicative of a threshold moisture level (e.g., lower moisture limit) in the desiccant 113 undergoing regeneration (e.g., drying) in the chambers 114 labeled as "B", or a combination thereof. In addition, the controller 114 may control the speed of rotation of the wheel 112, the flow rate of carbon dioxide 124 into the solid desiccant chambers 114 labeled as "A," the flow rate of low pressure nitrogen 118 into the solid desiccant chambers 114 labeled as "B," the flow rate of steam 122 through the heat exchangers 120, or any combination thereof. For example, the controller 114 may decrease the flow rate of carbon dioxide 124 to increase the residence time in the solid desiccant chambers 114 labeled as "A," thereby increasing the dehydration of the carbon dioxide 124. The controller 114 may also increase the flow rate of nitrogen 118 and/or steam 122 to increase the evaporation of water from the desiccant 113 in the solid desiccant chambers 114 labeled as "B." As discussed below, the controller 114 may also control the second stage of desiccant regeneration as illustrated in FIG. 5.

FIG. 5 is a schematic of an embodiment of the carbon dioxide dehydration system 110 of FIG. 4, illustrating a second regeneration stage of the regeneration sections 104. In the illustrated second stage, the regeneration sections 104 repressurize the chambers 114 prior to rotating the wheel 112, thereby ensuring that the pressure of the chambers 114 is substantially matched with the pressure of the incoming carbon dioxide 124. Accordingly, the regeneration sections 104 flow a high-pressure gas, e.g., high-pressure nitrogen 142, through the chambers 114 to raise the pressure. Other embodiments may employ another high-pressure gas other than nitrogen. Unlike the low-pressure nitrogen 118, which is heated, the high-pressure nitrogen 142 is not heated in the heat exchanger 120. In fact, the steam 140 or other heat source is turned off, allowing the high-pressure nitrogen 142 to remain at a lower temperature or environmental temperature (e.g., 80-100 degrees Fahrenheit). In certain embodiments, the regeneration sections 104 may initiate a third regeneration stage after the illustrated second regeneration stage of FIG. 5. For example, the regeneration sections 104 may flow a dried carbon dioxide through the chambers 114 to remove any residual nitrogen prior to rotating the wheel 112. In this manner, the regeneration sections 104 may reduce any trace amounts of nitrogen in the dryer carbon dioxide, thereby maintaining its purity.

Again, while the chambers 114 labeled as "B" are undergoing the second stage in regeneration of the solid desiccant 113, the chambers 114 labeled "A" are simultaneously dehydrating moist carbon dioxide gas 124. After completion of the desiccant regeneration, the controller 114 engages the motor 116 to rotate the wheel 112 to alternate the positions labeled as "A" and "B." At this point, the cycle repeats for the shifted chambers 114. In the embodiment of FIGS. 4 and 5, the wheel 112 includes a sliding seal to block leakage during its rotation.

Figure 6:
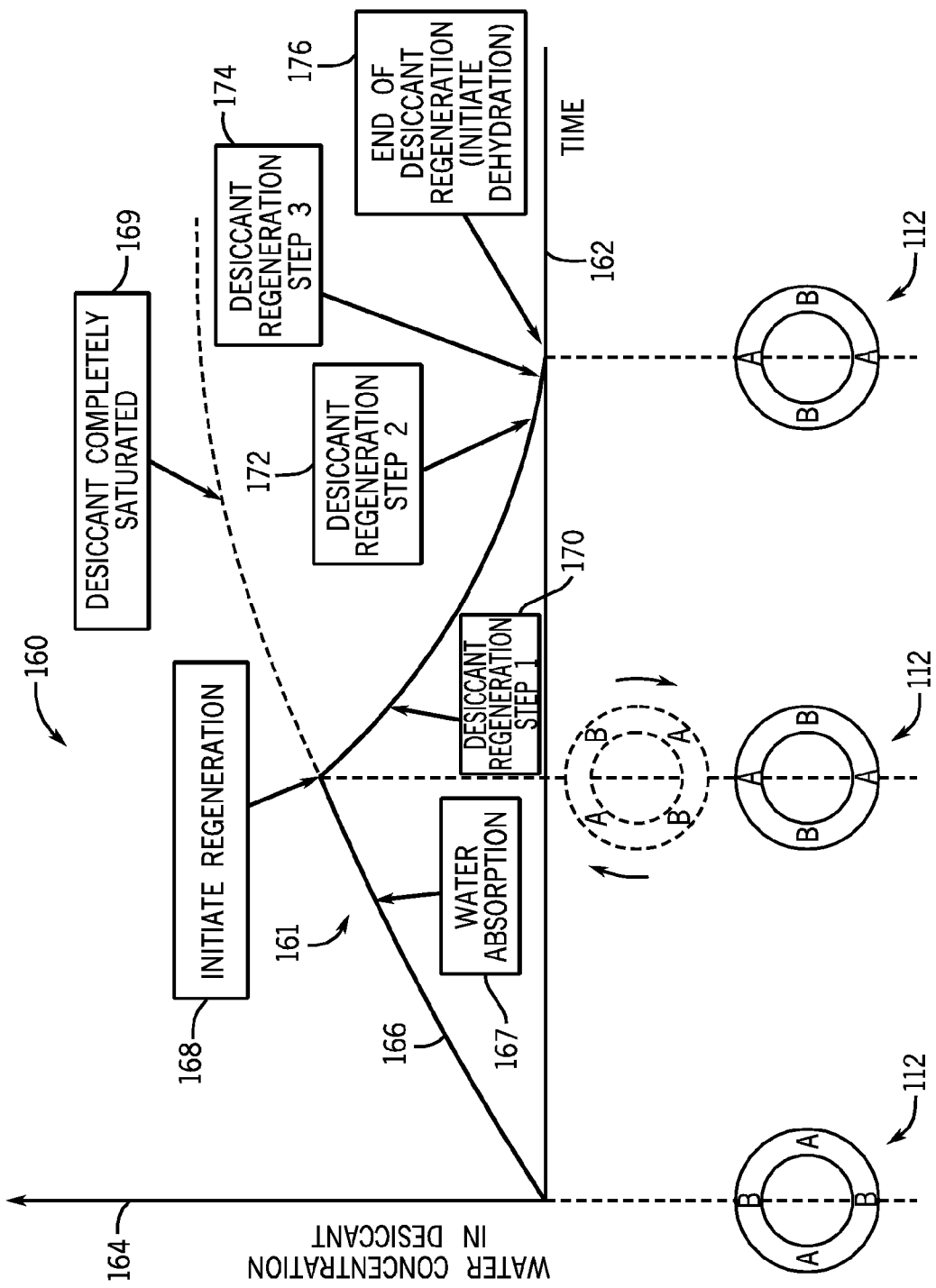
FIG. 6 is a graphical chart of an embodiment of a carbon dioxide dehydration and desiccant regeneration cycle of the carbon dioxide dehydration device of FIGS. 4 and 5.

FIG. 6 is a graphical chart 160 of an embodiment of a carbon dioxide dehydration and desiccant regeneration cycle 161 of the carbon dioxide dehydration system 110 of FIGS. 4 and 5. In particular, the cycle 161 represents the water concentration in the desiccant 113 with respect to time and position of the wheel in the regeneration sections 104. As illustrated in the graph 160, the horizontal axis 162 represents time and the vertical axis 164 represents the water concentration in the desiccant 113. Line 166 represents the cycle 161 of the hydration-regeneration of the solid desiccant 113. As illustrated in FIGS. 4 and 5, while two of the chambers 114 labeled as "A" remove moisture from the carbon dioxide 124 and increase in moisture content, the other two chambers 114 labeled as "B" undergo regeneration.

Referring to an individual chamber 114, the solid desiccant 113 in the chamber 114 first undergoes water absorption 167 in the one of the dehydration sections 102. The desiccant 113 will continue to hydrate until reaching an initiate regeneration point 168. At this point 168, the controller 144 may trigger the motor 116 to rotate the wheel 112 to move the dehydrating chambers 114 labeled as "A" into position to begin regeneration, while the regenerating chambers 114 labeled as "B" are moved into position to begin dehydrating the carbon dioxide 124. The initiate regeneration point 168 may depend on various factors including the type of desiccant, time needed to regenerate, and moisture content in the carbon dioxide gas. If the wheel 112 does not rotate the chambers 114 labeled as "A" from the dehydration sections 102 to the regeneration sections 104, then the desiccant 113 will eventually become completely saturated 169 with water and ineffective at dehydrating the carbon dioxide 124. Accordingly, the regeneration point 168 is selected well in advance of the saturation point 169. For example, the regeneration point 168 may correspond to less than approximately 50, 60, or 70 percent of the saturation point 169.

Upon reaching the initiate regeneration point 168, the wheel 112 rotates and the carbon dioxide dehydration system 110 begins the regeneration process with a first desiccant regeneration step 170. As discussed above, the first desiccant regeneration step 170 may flow a hot low-pressure nitrogen 118 through the solid desiccant 113 in the chamber 114 to evaporate the water in the desiccant 113. As illustrated by line 166, the water concentration 164 substantially drops during the first desiccant regeneration step 170. For example, the first desiccant regeneration step 170 may constitute at least approximately 80, 85, 90, or 95 percent of the water removal from the desiccant during the regeneration process. Subsequently, the carbon dioxide dehydration system 110 continues the regeneration process with a second desiccant regeneration step 172, which includes flow of an unheated high-pressure nitrogen through the solid desiccant 113 in the chamber 114 to repressurize the chamber 114. During repressurization, as seen in the graph, the desiccant 113 may still lose small amounts of moisture. For example, the second desiccant regeneration step 172 may constitute up to approximately 1 to 10 percent of the water removal from the desiccant during the regeneration process. Subsequently, the carbon dioxide dehydration system 110 continues the regeneration process with a third desiccant regeneration step 174, which includes flow of a dried carbon dioxide through the solid desiccant 113 in the chamber 114 to remove trace amounts of nitrogen. Thus, the step 174 may be described as a carbon dioxide sweep, which is configured to reduce the possibility of introducing nitrogen into the carbon dioxide (i.e., maintain the purity of the carbon dioxide). At point 176, all three regeneration steps are complete and the desiccant 113 in sections "A" is ready to initiate dehydration of the carbon dioxide. The wheel 112 may subsequently be rotated to begin regeneration of the sections labeled "B" and hydration of the sections labeled "A."

Figure 7:
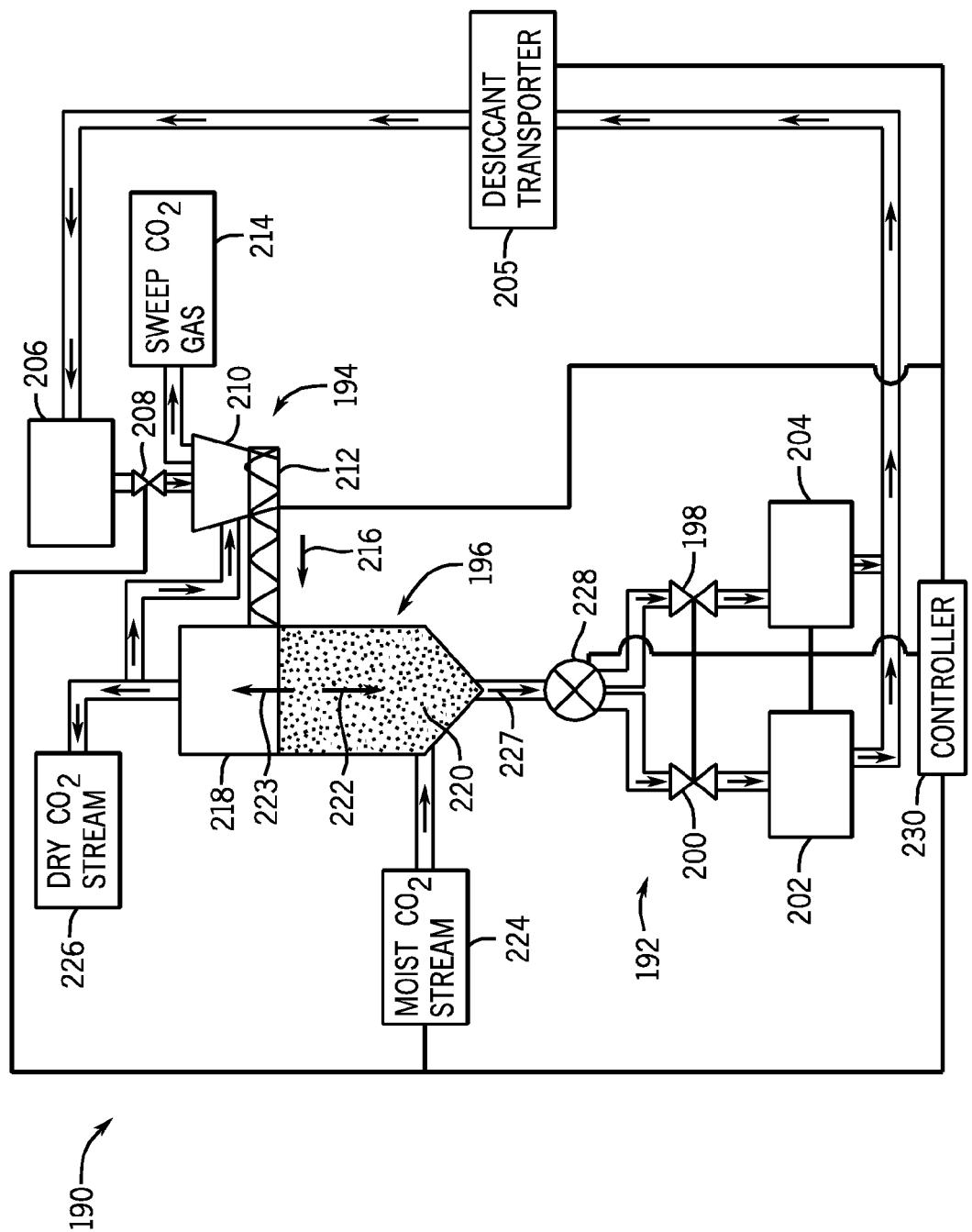
FIG. 7 is a schematic of an embodiment of a carbon dioxide dehydration device comprising a counterflow dehydration chamber supporting counter flows of carbon dioxide and a solid desiccant.

FIG. 7 is a schematic of an embodiment of a carbon dioxide dehydration device 190 comprising a counter flow dehydration chamber supporting counter flows of carbon dioxide and a solid desiccant. The carbon dioxide dehydration device 190 includes a regeneration portion 192, a feeder portion 194, and a dehydration portion 196. The regeneration portion 192 includes valves 198 and 200, that open and shut allowing solid desiccant to enter the regeneration vessels 202 and 204. The regeneration vessels 202 and 204 may alternate between filling and regenerating desiccant by way of the valves 198 and 200. After placement of the solid desiccant in the regeneration vessels 202 and 204, the solid desiccant may undergo regeneration, as discussed above. Once the desiccant regenerates, it is transported to the feeder portion 194 by a desiccant transporter 205. The desiccant transporter 205 may be a gravity feeder, screw feeder, pneumatic transporter, pump, flow inducing device, or a combination thereof. The desiccant transporter 205 induces flow of the dried desiccant to the feeder portion 194. In the illustrated embodiment, the desiccant transporter 205 induces a two-phase flow of the solid desiccant in a carrier gas, such as nitrogen.

The feeder portion 194 includes a storage chamber 206, valve 208, hopper 210, and screw feeder 212. The storage chamber 206 collects the regenerated desiccant delivered by the desiccant transporter 205. The valve 208 controls the flow of the regenerated desiccant into the hopper 210. Inside the hopper 210, a flow of carbon dioxide 214 sweeps away any trace amounts of the carrier gas (e.g., nitrogen) from the desiccant transporter 205. The hopper 210 then delivers the regenerated, swept desiccant into the screw feeder 212 for delivery in direction 216 into the dehydration portion 196. In the illustrated embodiment, the screw feeder 212 is configured to deliver the solid desiccant into the dehydration portion 196 at pressure of the carbon dioxide. In other embodiments, the hopper 210 and screw feeder 212 may be replaced with another feeder, such as a posimetric pump.

The dehydration portion 196 includes a counter flow desiccant vessel 218 that contains solid desiccant 220. For example, the solid desiccant 220 may include alumina-based desiccants, silica-based desiccants, calcium-based desiccants, molecular sieves, or other desiccant or hydrophilic substances, alone or in combination with one another. By further example, the solid desiccant 220 may include powder, pellets, flakes, or monolithic porous structures (e.g., wires, plates, etc.). The solid desiccant 220 moves in the direction of arrow 222 within the vessel 218. As the desiccant 220 flows in a desiccant path in the downward direction 222, the moist carbon dioxide 224 flows in a gas path in the opposite and upward direction 223 from its entrance near the bottom of the counter flow vessel 218. Thus, the flows 222 and 223 are counter to one another. This counter flow of the desiccant 220 and the moist carbon dioxide 224 substantially increases the removal of moisture from the carbon dioxide 224 into the solid desiccant 220. As the desiccant 220 continues to progress in the direction of arrow 222, the moisture content of the desiccant 220 increases until the desiccant 220 passes the inlet of the carbon dioxide 224 and exits the vessel 218. As a result, the carbon dioxide 224 flows in the upward direction 223 through the desiccant 220, which desiccant 220 is most dry toward the top, such that the desiccant 220 is increasing effective at absorbing moisture in the upward direction 223.

Eventually, the vessel 218 discharges a dry carbon dioxide stream 226 through a top of the vessel 218. In certain embodiments, the dry carbon dioxide stream 226 may have a water concentration of less than approximately 5, 10, 15, 20, 25, or 30 ppmv. This dry carbon dioxide stream 226 may then be transported (e.g., through pipelines) for sequestration or enhanced oil recovery, production of polycarbonate polymers, mineral carbonates/bicarbonates, biofuels production, accumulation in a $CO_2$ storage tank, or any combination thereof. In some embodiments, some of the exiting dry carbon dioxide stream 226 may be used to sweep the desiccant of regeneration gases or pneumatic transport gases.

As the vessel 218 discharges dry carbon dioxide stream 226 through the top, the vessel 218 discharges the moist desiccant 220 through the bottom of the vessel 218 as indicated by arrow 227. For example, the vessel 218 may discharge the moist desiccant 220 through a single hole or a plurality of holes at the bottom of the vessel 218. Upon exiting the vessel 218, the moist desiccant encounters a rotating valve 228 that channels the moist desiccant 220 toward valve 198 or 200. The valves 198 and 200 open and close to distribute the desiccant 220 into the regeneration vessels 202 and 204, and the process repeats itself. The system 190 also includes a controller 230 configured to control the opening and closing of the valves 198, 200, 208, and 228; the desiccant transporter 205; the screw feeder 212; the introduction of the moist carbon dioxide gas stream 224; as well as the regeneration vessels 202 and 204.

Technical effects of the disclosed embodiments may include a continuously operable desiccant based dehydration system, which continuously or repeatedly replenishes dehydration chambers with regenerated solid desiccant. The disclosed embodiments reduce the possibility of downtime, decrease the moisture content of carbon dioxide to low levels, reduce pressure losses, and increase the throughput of carbon capture systems. For example, the wheel-type desiccant transporter system of FIGS. 4, 5, and 6 enables movement of the solid desiccant between dehydration and regeneration sections to maintain effectiveness of the solid desiccant. Likewise, the counter flow desiccant system of FIG. 7 provides a continuous flow of regenerated solid desiccant in a counter flow against the carbon dioxide, thereby substantially increasing the effectiveness of the solid desiccant.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a carbon dioxide dehydration system, comprising:
  a desiccant transporter configured to transport a desiccant chamber with solid desiccant from a first dehydration section to a first regeneration section;
  a $CO_2$ path extending through the first dehydration section, wherein the solid desiccant is configured to collect moisture from $CO_2$ in the $CO_2$ path;
  a gas path extending through the first regeneration section, wherein the solid desiccant is configured to release the moisture into a gas in the gas path to regenerate the solid desiccant, and the $CO_2$ path and the gas path are independent from one another; and
  a controller configured to use instructions to depressurize the desiccant chamber in the first regeneration section with the gas at a first temperature and a first pressure, wherein the controller is configured to execute instructions to repressurize the desiccant chamber in the first regeneration section with the gas at a second temperature and a second pressure, the controller is configured to execute instructions sweeping the gas from the desiccant chamber in the first regeneration section with $CO_2$, the first temperature is greater than the second temperature, and the first pressure is less than the second pressure.

2. The system of claim 1, wherein the desiccant chamber is a first desiccant chamber containing a first volume of the solid desiccant, and the desiccant transporter is configured to move the first desiccant chamber from the first dehydration section to the first regeneration section.

3. The system of claim 2, wherein the desiccant transporter comprises a wheel having the first desiccant chamber, and the wheel is configured to rotate the first desiccant chamber from the first dehydration section to the first regeneration section.

4. The system of claim 3, wherein the carbon dioxide dehydration system comprises a second dehydration section and a second regeneration section, the wheel comprises second, third, and fourth desiccant chambers, and the wheel is configured to rotate the first, second, third, and fourth desiccant chambers sequentially among the first dehydration section, the first regeneration section, the second dehydration section, and a second regeneration section.

5. The system of claim 2, wherein the desiccant transporter comprises a second desiccant chamber containing a second volume of the solid desiccant, and the desiccant transporter is configured to move the first and second desiccant chambers sequentially among the first dehydration section and the first regeneration section.

6. The system of claim 1, wherein the first regeneration section is configured to heat the solid desiccant with the gas in the gas path.

7. The system of claim 6, comprising a heat exchanger configured to transfer heat from a steam path to the gas path.

8. The system of claim 6, wherein the gas path comprises a nitrogen path through the first regeneration section.

9. The system of claim 1, wherein the controller is configured to control the carbon dioxide dehydration system based on feedback indicative of a moisture level.

10. The system of claim 9, wherein the controller is configured to control a $CO_2$ flow rate through the $CO_2$ path, a gas flow rate through the gas path, a heat transfer to the gas path, a movement of the solid desiccant, or a combination thereof.

11. The system of claim 10, wherein the controller is configured to control a rotation of a wheel to control the movement of the solid desiccant, and the wheel comprises the first dehydration section and the first regeneration section of the desiccant transporter.

12. The system of claim 9, wherein the controller is configured to control the carbon dioxide dehydration system to maintain the $CO_2$ below a threshold moisture level.

13. The system of claim 1, wherein the desiccant transporter comprises a wheel having the first dehydration section and the first regeneration section, and a controller is configured to iteratively rotate the wheel, stop the wheel to enable the first dehydration section to receive the $CO_2$ along the $CO_2$ path and to enable the first regeneration section to receive the gas along the gas path, and subsequently rotate the wheel after a time delay.

14. The system of claim 1, comprising a carbon capture system configured to capture the $CO_2$ from a source, wherein the carbon dioxide dehydration system is configured to receive the $CO_2$ from the carbon capture system.

15. A gas dehydrator system, comprising:
  a desiccant transport ring configured to rotate a solid desiccant in a sealed desiccant chamber from a first dehydration section to a first regeneration section;
  a first gas path extending through the first dehydration section, wherein the solid desiccant is configured to collect moisture from a first gas in the first gas path;
  a second gas path extending through the first regeneration section, wherein the solid desiccant is configured to release the moisture into a second gas in the second gas path to regenerate the solid desiccant, and the first and second gas paths are independent from one another; and
  a controller configured to execute instructions to depressurize the sealed desiccant chamber in the first regeneration section with the second gas at a first temperature and a first pressure, wherein the controller is configured to execute instructions to repressurize the desiccant chamber in the first regeneration section with the second gas at a second temperature and a second pressure, the controller is configured to execute instructions sweeping the second gas from the desiccant chamber in the first regeneration section with the first gas, the first temperature is greater than the second temperature, and the first pressure is less than the second pressure.

16. The system of claim 15, wherein the first gas path comprises a carbon dioxide ($CO_2$) path.

17. The system of claim 15, wherein the second gas path comprises a nitrogen path.

18. The system of claim 15, wherein the desiccant transport ring comprises a plurality of sealed desiccant chambers each defining a separate volume of the solid desiccant, and the desiccant transport ring is configured to rotate the plurality of sealed desiccant chambers from the first dehydration section to the first regeneration section.

19. The system of claim 18, wherein the system further comprises a second dehydration section and a second regeneration section, and the desiccant transport ring is configured to rotate the plurality of sealed desiccant chambers sequentially among the first dehydration section, the first regeneration section, the second dehydration section, and a second regeneration section.

20. The system of claim 15, wherein the first regeneration section is configured to depressurize a sealed desiccant chamber with the second gas at a first temperature and a first pressure, the first regeneration section is configured to repressurize the sealed desiccant chamber with the second gas at a second temperature and a second pressure, the first regeneration section is configured on the second gas from the sealed desiccant chamber with the first gas downstream of the gas dehydrator, the first temperature is greater than the second temperature, and the first pressure is less than the second pressure.

21. The system of claim 15, wherein the controller is configured to control the gas dehydration system based on feedback indicative of a moisture level to maintain the first gas below a threshold moisture level.

22. The system of claim 21, wherein the first gas is carbon dioxide ($CO_2$) and the second gas is nitrogen.

23. A gas dehydrator system, comprising:
a desiccant transporter configured to rotate a solid desiccant within a sealed desiccant chamber from a first dehydration section to a first regeneration section;
a first gas path extending through the first dehydration section, wherein the solid desiccant is configured to collect moisture from a first gas in the first gas path;
a second gas path extending through the first regeneration section, wherein the solid desiccant is configured to release the moisture into a second gas in the second gas path to regenerate the solid desiccant, and the first and second gas paths are independent from one another; and
a controller configured to execute instructions to depressurize the sealed desiccant chamber in the first regeneration section with the second gas at a first temperature and a first pressure, wherein the controller is configured to execute instructions to repressurize the desiccant chamber in the first regeneration section with the second gas at a second temperature and a second pressure, the controller is configured to execute instructions sweeping the second gas from the desiccant chamber in the first regeneration section with the first gas, the first temperature is greater than the second temperature, and the first pressure is less than the second pressure.

24. The system of claim 23, wherein the desiccant transporter comprises a ring having a plurality of sealed desiccant chambers each defining a separate volume of the solid desiccant, and the desiccant transporter is configured to rotate the plurality of desiccant chambers sequentially from the first dehydration section to the first regeneration section.

* * * * *